（12） United States Patent
Natsume et al.

(10) Patent No.: US 8,708,538 B2
(45) Date of Patent: Apr. 29, 2014

(54) VEHICLE LAMP (75) Inventors: Kazunori Natsume, Shizuoka (JP);
Hiroya Koizumi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 27 days.

(21) Appl. No.: 13/535,582

(22) Filed: Jun. 28, 2012

(65) Prior Publication Data

US 2013/0010486 A1    Jan. 10, 2013

(30) Foreign Application Priority Data

Jul. 5, 2011    (JP) .................................. 2011-149152

(51) Int. Cl.
*F21V 9/00*    (2006.01)

(52) U.S. Cl.
USPC ........... 362/511; 362/516; 362/545; 362/602; 362/605; 362/612; 349/65

(58) Field of Classification Search
USPC ......... 362/509, 511, 516, 545, 602, 605, 612; 349/65
See application file for complete search history.

(56) References Cited

U.S. PATENT DOCUMENTS

| 6,955,459 | B2 * | 10/2005 | Mochizuki et al. | 362/602 |
| 7,654,721 | B2 * | 2/2010 | Okada | 362/612 |
| 7,775,697 | B2 * | 8/2010 | Hirano et al. | 362/511 |
| 8,206,017 | B2 * | 6/2012 | Zwick | 362/511 |

FOREIGN PATENT DOCUMENTS

| EP | 1970616 A1 | 9/2008 |
| EP | 2258977 A2 | 12/2010 |
| JP | 2005-122946 | 5/2005 |
| JP | 2005-267928 | 9/2005 |

OTHER PUBLICATIONS

European Patent Office, Extended Search Report in EP Application No. 12175059.0-1756/2543925 (dated Dec. 20, 2013).

* cited by examiner

*Primary Examiner* — Stephen F Husar
(74) *Attorney, Agent, or Firm* — Fish & Richardson P.C.

(57) ABSTRACT

A vehicle lamp includes a plurality of light sources, and a light guide plate configured to emit light to the front side of the lamp from a second surface facing a first surface by internally reflecting light, which is emitted from the respective light sources, by a plurality of reflective elements formed on the first surface after causing the light to enter the light guide plate from a rear end face of the light guide plate. The light guide plate is curved to the first surface and gradually becomes thinner toward the front side. The reflective elements are disposed at a predetermined interval in a longitudinal direction and extend in a direction crossing the longitudinal direction.

4 Claims, 6 Drawing Sheets

VEHICLE LAMP

CROSS-REFERENCE TO RELATED APPLICATION(S)

The present application claims the benefit of priority of Japanese Patent Application No. 2011-149152, filed on Jul. 5, 2011, the contents of which are incorporated herein by reference.

BACKGROUND

1. Technical Field

The present disclosure relates to a vehicle lamp including a light guide plate.

2. Related Art

Some vehicle lamps are adapted to emit light to the front side of the lamp from its front surface by internally reflecting light, which is emitted from a plurality of light sources such as light-emitting diodes, by a plurality of reflective elements formed on its rear surface after making the light enter a light guide plate from a rear end face thereof.

Japanese Patent Document JP-A-2005-122946, for example, discloses a structure in which a side end face of the light guide plate, where the light emitted from the respective light sources enters, is disposed close to a rear end face in a direction facing the rear end face in such a vehicle lamp.

If a structure that causes the light emitted from the respective light sources to enter the light guide plate from the rear end face is used as the structure of the light guide plate, it is possible to place the light guide plate so that it is curved along the shape of the vehicle body after easily securing a space in which the respective light sources are disposed.

However, when the light emitted from the respective light sources enters the light guide plate from the rear end face as described above, it is necessary to cause the light to reach an emission surface of the light guide plate at an incidence angle smaller than a critical angle in order to emit the light, which enters the light guide plate, to the front side of the lamp. This, however, is not necessarily easy. For this reason, a problem can arise in that it also may not be easy to make the light guide plate appear to emit light uniformly in the front view of the lamp.

SUMMARY

One or more exemplary embodiments of the present invention provide a vehicle lamp that can make a light guide plate appear to emit light uniformly in the front view of the lamp even when the light guide plate of the vehicle lamp has a structure that causes light emitted from respective light sources to enter the light guide plate from a rear end face.

In some implementations, the foregoing feature is achieved based on a study on the shape of a light guide plate.

A vehicle lamp according to an exemplary embodiment includes a plurality of light sources, and a light guide plate configured to emit light to the front side of the lamp from a second surface facing a first surface by internally reflecting light, which is emitted from the respective light sources, by a plurality of reflective elements formed on the first surface after making the light enter the light guide plate from a rear end face of the light guide plate. The light guide plate is curved to the first surface and gradually becomes thinner toward the front side. The reflective elements are disposed at a predetermined interval in a longitudinal direction and extend in a direction crossing the longitudinal direction.

The type of the "light source" is not restricted and may be, for example, a light-emitting diode.

As long as the "light guide plate" is curved to the first surface and gradually becomes thinner toward the front side, the specific shape of the light guide plate is not restricted. In this case, "curved to the first surface toward the front side" means that the light guide plate is curved so that a first surface side becomes concave and a second surface side becomes convex in a longitudinal direction.

The "first surface side" may correspond to any one of an upward direction, a downward direction, a left direction, a right direction, and an inclined direction between the foregoing directions.

The "internal reflection" performed by the respective "reflective elements" may be performed, for example, by total reflection and may be performed as normal mirror reflection by performing mirror surface treatment on the surfaces of the reflective elements.

In some implementations, it is possible to obtain the following functional effect.

Light, which enters the light guide plate from the rear end face of the light guide plate, is guided to the front side while total reflection of the light is repeated sequentially by the first and second surfaces, but the light guide plate is curved forward to the first surface. Accordingly, at a position ahead of the rear end face of the light guide plate to some extent, a portion of the light, which is reflected internally by the reflective elements of the first surface, reaches the second surface at an incidence angle smaller than a critical angle and is emitted from the second surface to the front side of the lamp. Further, a portion of the light, which continues to be guided further, is reflected internally at a position further ahead of the position by the reflective elements of the first surface, reaches the second surface at an incidence angle smaller than a critical angle, and is emitted from the second surface to the front side of the lamp.

In this case, since the light guide plate gradually becomes thinner toward the front side, it is possible to obtain the following functional effect.

If the thickness of the light guide plate, which is curved to the first surface toward the front side, is constant, it is necessary to make larger a level difference between the front or rear end edges of the reflective elements, which are positioned on the further front side, of the respective reflective elements in order to make the light, which is reflected internally by the reflective elements 24s of the first surface, reach the second surface at an incidence angle smaller than a critical angle. However, the light, which is guided to the front end portion of the light guide plate, decreases in this case. In that regard, if the light guide plate gradually becomes thinner toward the front side, it is possible to prevent a level difference between the respective reflective elements from becoming excessively large and to guide light to the front end portion of the light guide plate easily. Accordingly, it is possible to make the light guide plate appear to emit light uniformly in the front view of the lamp.

In some implementations, even when the guide plate of the vehicle lamp including the light guide plate is adapted to cause light, which is emitted from the respective light sources, to enter the light guide plate from the rear end face, it is possible to make the light guide plate appear to emit light uniformly in the front view of the lamp.

In this case, since the longitudinal width of the reflective element, which is positioned on the further front side of the respective reflective elements, is set to the larger value, it is possible to obtain the following functional effect.

Light guided in the light guide plate gradually decreases toward the front side. Accordingly, by setting the longitudinal width of the reflective element, which is positioned on the further front side, to a larger value, it is possible to make the intensity of light, which is internally reflected by the respective reflective elements and emitted from the second surface to the front side of the lamp, more uniform between the respective reflective elements. Therefore, it is possible to make the light guide plate appear to emit light uniformly in the front view of the lamp.

In this case, a level difference between the front or rear end edges of the reflective elements, which are positioned on the front side, is large. However, since the light guide plate gradually becomes thinner toward the front side, it is possible to prevent a level difference between the respective reflective elements from becoming excessively large.

If the light guide plate is curved to the second surface toward an end portion in a direction orthogonal to the longitudinal direction in the above-mentioned structure, a direction in which the light guide plate is curved in the longitudinal direction is opposite to a direction in which the light guide plate is curved in a direction orthogonal to the longitudinal direction. Accordingly, it is possible to make the design of the lamp have originality or to increase the degree of freedom in the layout of the lamp. For example, when the light guide plate is disposed so as to surround another lamp unit at the rear end area of the light guide plate, it is possible to obtain a design where the light guide plate is curved and widened forward toward the outer periphery from the periphery of the lamp unit. A "direction orthogonal to the longitudinal direction" in this case may be a width direction, a vertical direction, or an inclined direction. Further, "curved to the second surface toward an end portion in a direction orthogonal to the longitudinal direction" means that the first surface is convex and the second surface side is curved to be convex in a direction orthogonal to the longitudinal direction.

Other aspects, features and advantages will be apparent from the following detailed description, the accompanying drawings, and the claims.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION

An example of an embodiment of the invention is described below with reference to the drawings.

Figure 1:
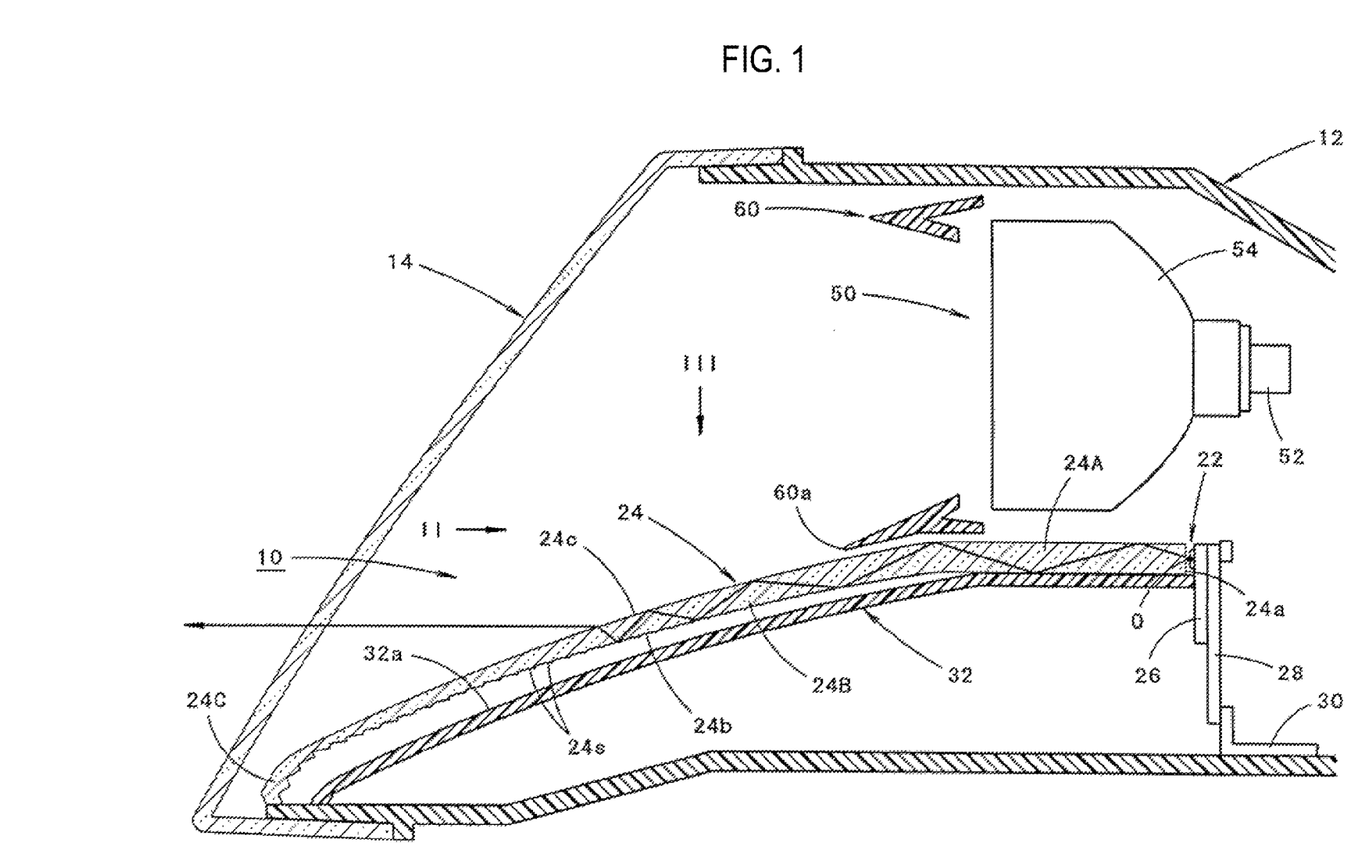
FIG. 1 is a side cross-sectional view of a vehicle lamp according to an embodiment.
Figure 2:
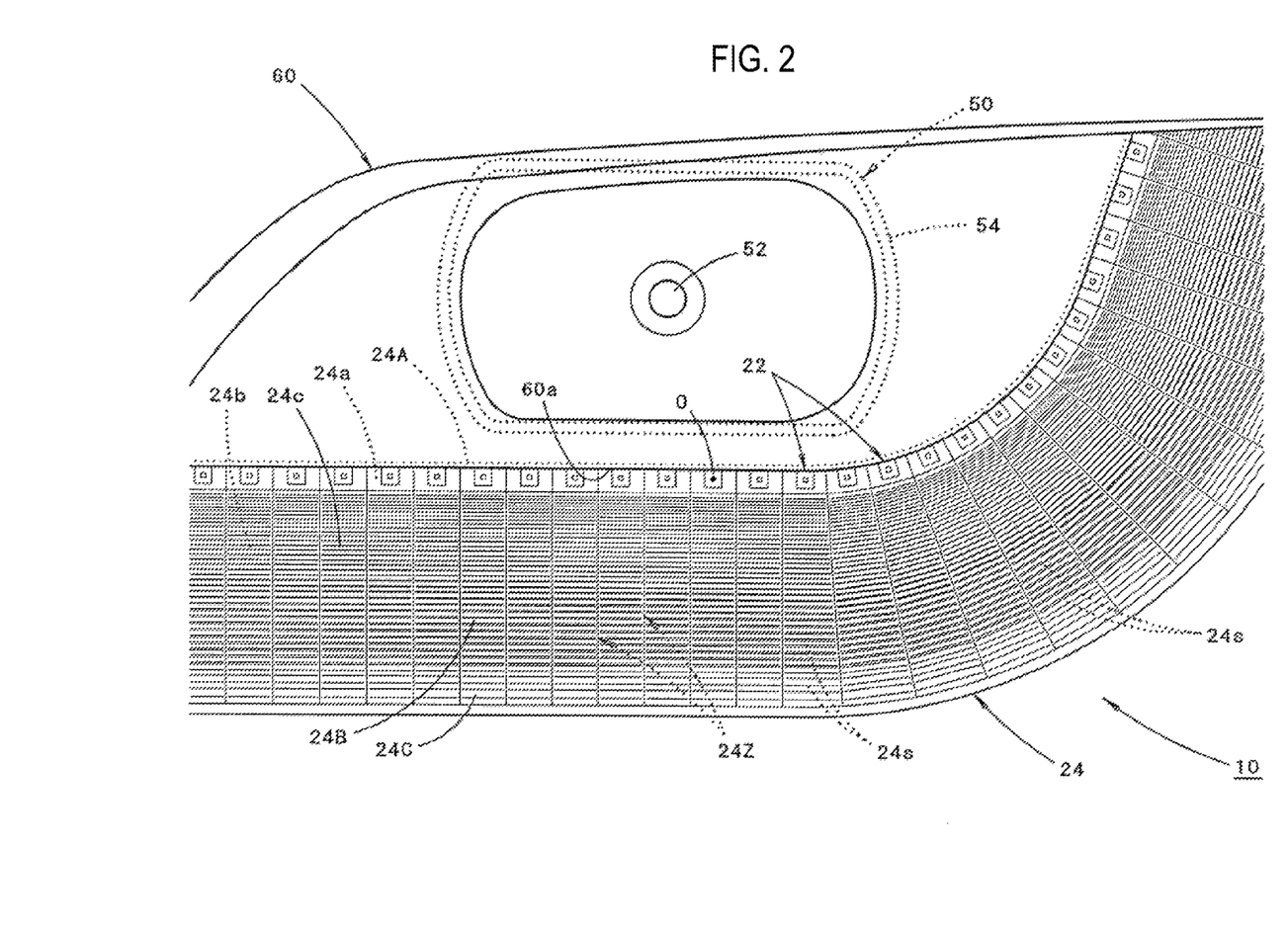
FIG. 2 is a view seen in the direction of arrow II of FIG. 1.
Figure 3:
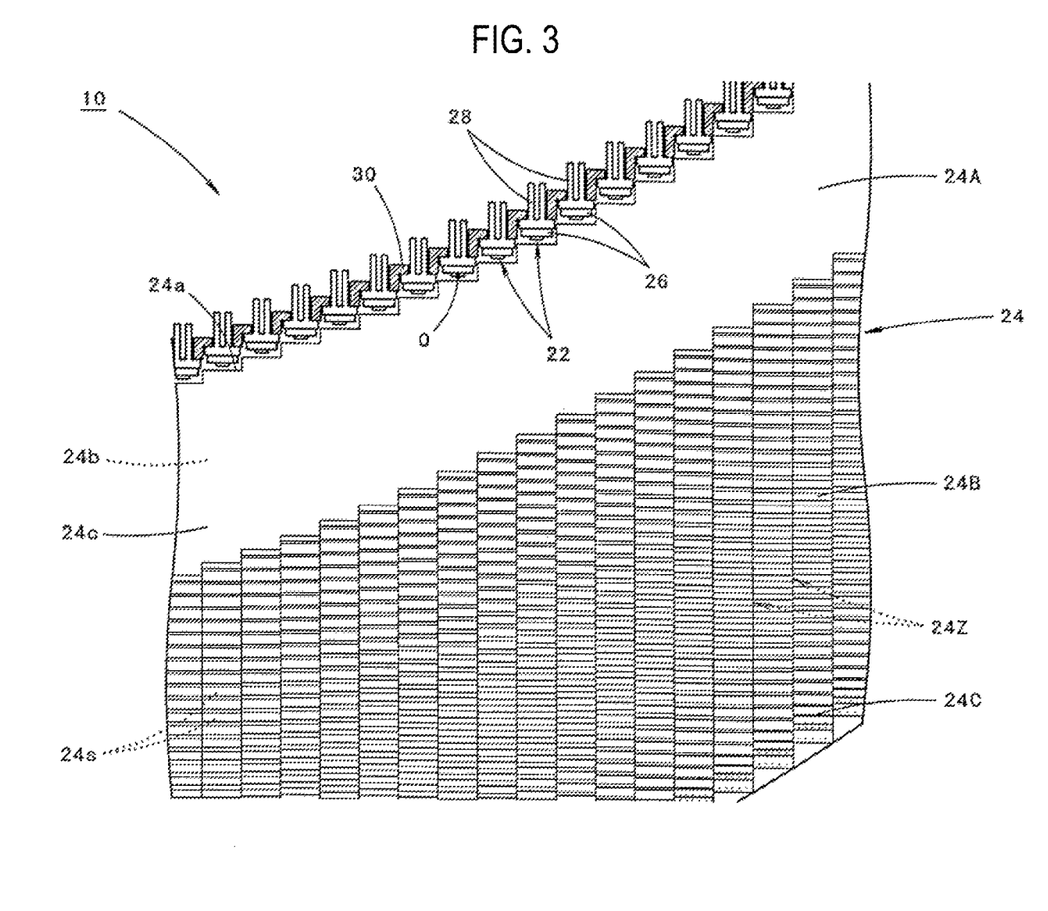
FIG. 3 is a view seen in the direction of arrow III of FIG. 1.

FIG. 1 is a side cross-sectional view of a vehicle lamp 10. Further, FIG. 2 is a view seen in the direction of arrow II of FIG. 1, and FIG. 3 is a view seen in the direction of arrow III of FIG. 1.

As shown in these drawings, the vehicle lamp 10 is a daytime operating lamp that is provided at the left front end portion of a vehicle and is assembled in a lamp chamber, which is formed by a lamp body 12 and a transparent and translucent cover 14 mounted on the front end opening of the lamp body 12, together with a headlamp unit 50.

The vehicle lamp 10 includes a plurality of light-emitting diodes 22 and a light guide plate 24.

As shown in FIG. 1, the light guide plate 24 is adapted to emit light to the front side of the lamp from its upper surface 24c by internally reflecting light, which is emitted from the respective light-emitting diodes 22, by a plurality of reflective elements 24s formed on a lower surface 24b thereof after causing the light to enter the light guide plate from a rear end face 24a thereof.

A rear area 24A of the light guide plate 24 from the rear end face 24a to a predetermined front range is in the shape of a flat plate so as to extend along a horizontal plane, but a main area 24B formed on the front side of the rear area 24A is curved to the lower surface 24b and gradually becomes thinner toward the front side. Further, a front end area 24C of the light guide plate 24 is even more curved to the lower surface 24b toward the front side, and the thickness of the front end area 24C is slightly larger than that of the front end portion of the main area 24B.

As shown in FIG. 3, the light guide plate 24 is curved rearward toward its left end portion (the right end portion in FIG. 3, similarly hereinafter) in a width direction of a vehicle. In accordance with this feature, the rear end face 24a of the light guide plate 24 is displaced in the shape of a staircase at every position corresponding to the respective light-emitting diodes 22. Further, as shown in FIG. 2, the light guide plate 24 is curved to the upper surface 24c toward the left end portion thereof. Furthermore, the light guide plate 24 is fixed to the lamp body 12 at the lower end position and both left and right end positions of the front end area 24C.

The light-emitting diodes 22 are disposed near the rear end face 24a of the light guide plate 24 so as to face the front side. Further, the light-emitting diodes 22 are disposed at substantially regular intervals in the width direction. In this case, the light-emitting diode 22, which is positioned on the further left side of the plurality of light-emitting diodes 22, is displaced further rearward in accordance with the rear end face 24a of the light guide plate 24 that is formed in the shape of a staircase.

The light-emitting diodes 22 are fixed to upper end portions of the front surfaces of vertically long substrates 26, respectively. Further, the substrates 26 are fixed to the front surfaces of heat sinks 28 that extend in a vertical direction of the vehicle so as to have a substantially π-shaped cross-section, respectively. Furthermore, the respective heat sinks 28 are fixed to a common light source supporting member 30. Moreover, the light source supporting member 30 is fixed to the lamp body 12.

A reflective panel 32, which is formed to extend substantially along the shape of the light guide plate 24, is disposed near the lower portion of the light guide plate 24. Since mirror surface treatment is performed on an upper surface 32a of the reflective panel 32, the reflective panel 32 is adapted to reflect the light that slightly leaks downward from the light guide plate 24.

The rear area of the reflective panel 32 comes into close contact with the rear area 24A of the light guide plate 24, and the other area of the reflective panel is separated from the light guide plate 24. In this case, the reflective panel 32 is formed so that a gap between the light guide plate 24 and the reflective panel 32 gradually increases from the rear end position of the main area 24B of the light guide plate 24 toward the front end position of the main area. Further, the rear end face of the reflective panel 32 comes into contact with the substrates 26, and the lower surface of the front end portion of the reflective panel comes into contact with the lamp body 12.

The headlamp unit 50 is positioned near the upper portion of the rear area 24A of the light guide plate 24.

The headlamp unit 50 includes a light source bulb 52 and a reflector 54 that reflects the light emitted from the light source bulb 52 to the front side. Further, the headlamp unit 50 is supported on the lamp body 12 by an aiming mechanism (not shown).

The light guide plate 24 detours around the headlamp unit 50 from the lower side of the headlamp unit to the left side of the headlamp unit.

An extension member 60, which is formed in an annular shape so as to cover the front end opening of the reflector 54, is disposed near the front portion of the headlamp unit 50.

The extension member 60 is disposed so that the lower area of the extension member 60 is positioned at a boundary portion between the rear area 24A and the main area 24B of the light guide plate 24, and the outer peripheral edge 60a of the lower end of the extension member 60 extends to a position that is slightly lower than the upper surface of the rear area 24A of the light guide plate 24.

Figure 4:
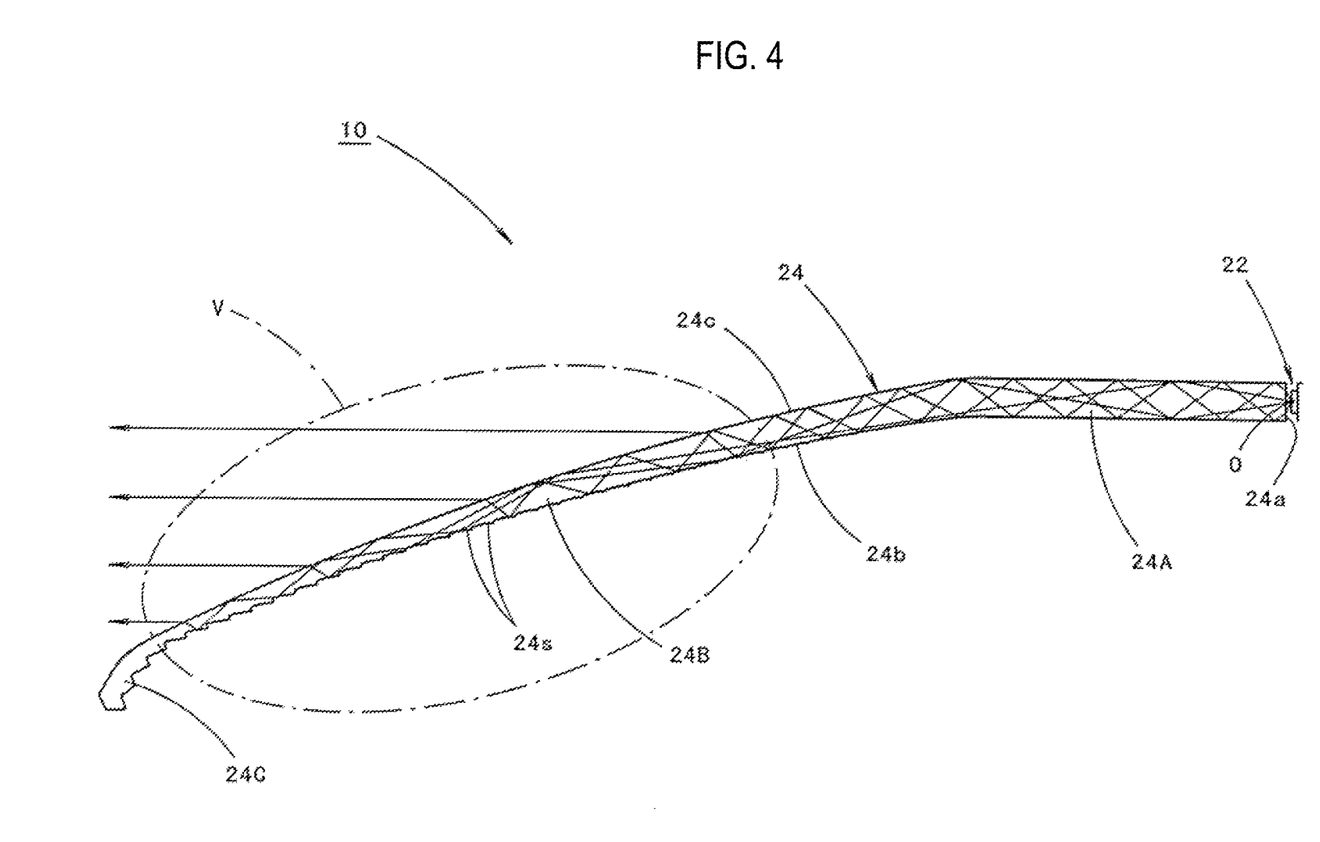
FIG. 4 is a view showing a light guide plate, which is extracted from the vehicle lamp shown in FIG. 1, and optical paths of light, which are emitted from a light source, in detail.
Figure 5:
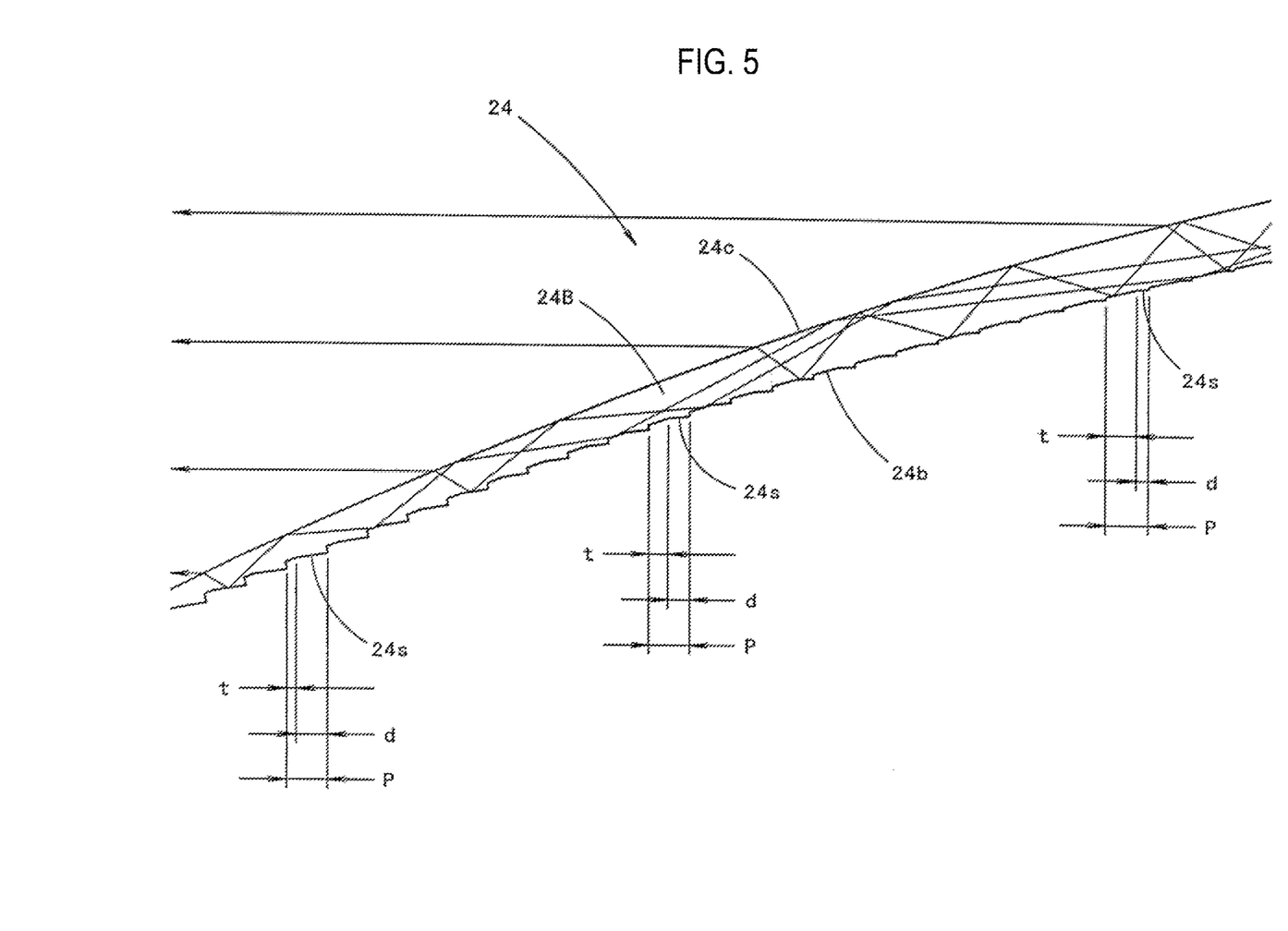
FIG. 5 is a detailed view of the V portion of FIG. 4.

FIG. 4 is a view showing in greater detail the light guide plate 24, which is extracted from the vehicle lamp 10 shown in FIG. 1, and optical paths of light, which is emitted from the light-emitting diodes 22. FIG. 5 is a detailed view of a V portion of FIG. 4.

In this case, FIG. 4 shows an optical path of light that is emitted from the light emission center O of the light-emitting diode 22 and enters the light guide plate 24 from the rear end face 24a.

As shown in FIG. 4, the reflective elements 24s are formed on the main area 24B and the front end area 24C of the light guide plate 24.

The reflective elements 24s extend in the width direction and are disposed at substantially regular intervals in a longitudinal direction of the vehicle. In this case, the longitudinal width of the reflective element 24s, which is positioned on the further front side, of the respective reflective elements 24s is set to a larger value.

That is, as shown in FIG. 5, the respective reflective elements 24s the main area 24B are formed so that the pitch P of the reflective elements 24s in the longitudinal direction is substantially constant and the longitudinal width d of each of the reflective elements 24s gradually increases toward the front end position from the rear end position of the main area 24B.

Accordingly, as for light that enters the light guide plate 24 from the rear end face 24a of the light guide plate 24 and is guided to the front side while the total reflection of the light is sequentially repeated by the lower surface 24b and the upper surface 24c, the probability that the light reaches the reflective element 24s decreases at the position near the rear end position of the main area 24B and the probability that the light reaches the reflective element 24s increases as the light approaches the front end position of the main area 24B. As a result, the light is guided smoothly to the front end portion of the light guide plate 24.

As shown in FIG. 3, the reflective elements 24s are formed in the shape of a staircase at every position corresponding to the respective light-emitting diodes 22, as band-like areas 24Z extending in the longitudinal direction.

Functional effects of this embodiment are described below.

The vehicle lamp 10 according to this embodiment is adapted to emit light to the front side of the lamp from the upper surface 24c (that is, a second surface facing the lower surface 24b) by internally reflecting light, which is emitted from the respective light-emitting diodes 22 (i.e., light sources), by the reflective elements 24s on the lower surface 24b (i.e., a first surface) after causing the light to enter the light guide plate 24 from the rear end face 24a. However, since the light guide plate 24 is curved to the lower surface 24b and gradually becomes thinner toward the front side and the reflective elements 24s are disposed at a predetermined interval in the longitudinal direction and extend in the width direction (i.e., a direction crossing the longitudinal direction), it is possible to obtain the following functional effect.

Light, which enters the light guide plate 24 from the rear end face 24a of the light guide plate 24, is guided to the front side while the total reflection of the light is repeated sequentially by the lower surface 24b and the upper surface 24c, but the light guide plate 24 is curved forward to the lower surface 24b. Accordingly, at a position ahead of the rear end face 24a to some extent, a portion of the light, which is internally reflected by the reflective elements 24s of the lower surface 24b, reaches the upper surface 24c at an incidence angle smaller than a critical angle and is emitted from the upper surface 24c to the front side of the lamp. Further, a portion of the light, which continues to be further guided, is reflected internally at a position further ahead of the position by the reflective elements 24s of the lower surface 24b, reaches the upper surface 24c at an incidence angle smaller than a critical angle, and is emitted from the upper surface 24c to the front side of the lamp.

In this case, since the light guide plate 24 gradually becomes thinner toward the front side, it is possible to obtain the following functional effect.

If the thickness of the light guide plate 24, which is curved to the lower surface 24b toward the front side, is constant, it is necessary to make larger a level difference between the rear end edges of the reflective elements 24s, which are positioned on the further front side, of the respective reflective elements 24sto cause the light, which is internally reflected by the reflective elements 24s of the lower surface 24b, to reach the upper surface 24c at an incidence angle smaller than a critical angle. However, the light, which is guided to the front end portion of the light guide plate 24, decreases in this case. In that regard, since the light guide plate 24 of this embodiment gradually becomes thinner toward the front side, it is possible to prevent a level difference between the respective reflective elements 24s from becoming excessively large and to guide light easily to the front end portion of the light guide plate 24. Accordingly, it is possible to cause the light guide plate 24 to appear to emit light uniformly in the front view of the lamp.

According to this embodiment, even when the guide plate 24 of the vehicle lamp 10 including the light guide plate 24 is adapted to cause light, which is emitted from the respective light-emitting diodes 22, to enter the light guide plate from the rear end face 24a, it is possible to cause the light guide plate 24 to appear to emit light uniformly in the front view of the lamp.

In this case, since the longitudinal width d of the reflective element 24s, which is positioned on the further front side, of the respective reflective elements 24s is set to a larger value in this embodiment, it is possible to obtain the following functional effect.

The light guided in the light guide plate 24 gradually decreases toward the front side. Accordingly, by setting the longitudinal width d of the reflective element 24s, which is positioned on the further front side, to a larger value as in this embodiment, it is possible to make more uniform the intensity of light, which is internally reflected by the respective reflective elements 24s and emitted from the upper surface 24c to the front side of the lamp, between the respective reflective elements 24s. Therefore, it is possible to cause the light guide plate 24 to appear to emit light uniformly in the front view of the lamp.

Meanwhile, in this case, a level difference between the rear end edges of the reflective elements 24s, which are positioned on the front side, is large. However, since the light guide plate 24 gradually becomes thinner toward the front side, it is possible to prevent a level difference between the respective reflective elements 24s from becoming excessively large.

In addition, since the pitch P of the reflective elements 24s, which are formed on the main area 24B, in the longitudinal direction is set to a substantially constant value in this embodiment, it is possible to obtain the following functional effect.

As for light that enters the light guide plate 24 from the rear end face 24a of the light guide plate 24 and is guided to the front side while the total reflection of the light is repeated sequentially by the lower surface 24b and the upper surface 24c, the probability that the light reaches the reflective element 24s decreases since a value t (=P−d) is large at the position near the rear end position of the main area 24B and the probability that the light reaches the reflective element 24s increases since a value t gradually decreases as the light approaches the front end position of the main area 24B. Accordingly, it is possible to guide the light to the front end portion of the light guide plate 24 more smoothly.

Further, since the light guide plate 24 is curved to the upper surface 24c toward the left end portion in the width direction in this embodiment, a direction in which the light guide plate 24 is curved in the longitudinal direction is opposite to a direction in which the light guide plate 24 is curved in the width direction. Accordingly, it is possible to make the design of the lamp have originality or to increase the degree of freedom in the layout of the lamp. That is, in this embodiment, the light guide plate 24 surrounds the headlamp unit 50 at the rear area 24A. However, in this case, it is possible to obtain a design where the light guide plate 24 is curved and widened forward toward the outer periphery from the periphery of the headlamp unit 50.

In the foregoing example, the value t (=P−d) is set to decrease gradually toward the front end position after the pitch P of the respective reflective elements 24s in the longitudinal direction is set to a substantially constant value, in order to make the longitudinal width d of each of the reflective elements 24s gradually increase toward the front end position from the rear end position of the main area 24B. However, instead of this, the pitch P of the respective reflective elements 24s in the longitudinal direction may be set to gradually increase toward the front end position after the value t (=P−d) is set to a substantially constant value.

Moreover, in the foregoing example, the respective reflective elements 24s extend in the width direction. However, the respective reflective elements may extend in a direction such that the respective reflective elements are inclined in the longitudinal direction with respect to the width direction (for example, a direction parallel to the front end edge of the light guide plate 24).

An example in which the vehicle lamp 10 is a daytime operating lamp provided at the left front end portion of a vehicle has been described in the foregoing example. However, even in a case where the vehicle lamp 10 is a daytime operating lamp provided at the right front end portion of a vehicle, a case where the vehicle lamp 10 is a lamp other than a daytime operating lamp, and a case where the vehicle lamp 10 is a lamp provided at the rear end portion of a vehicle, it is possible to obtain the same functional effects as described above by employing the same structure as the structure of the foregoing example.

A modification of the above-mentioned embodiment is described next.

Figure 6:
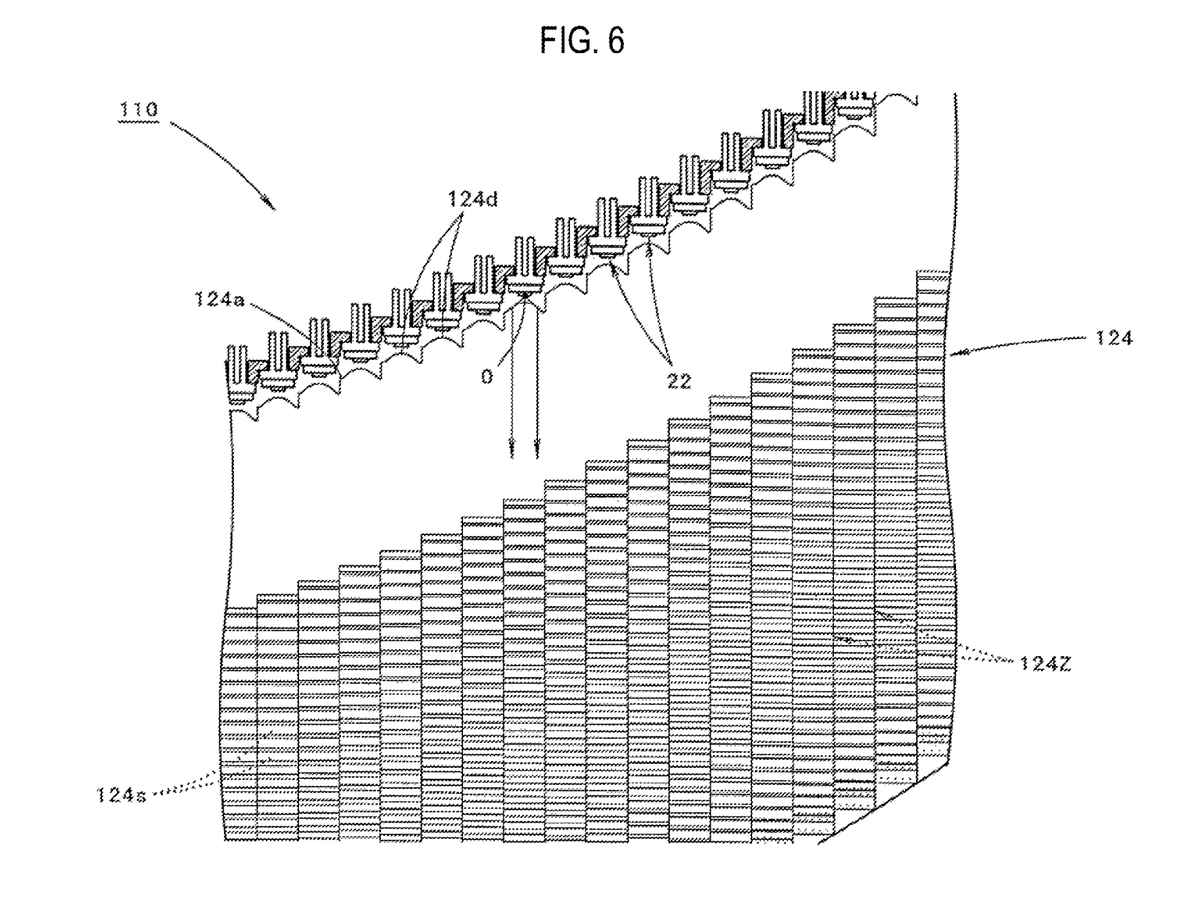
FIG. 6 is a view, which is the same as FIG. 3, showing a vehicle lamp according to a modification of the embodiment.

FIG. 6 is a view, which is the same as FIG. 3, showing a vehicle lamp 110 according to a modification of the forgoing example.

As shown in FIG. 6, the basic structure of the vehicle lamp 110 according to this modification is the same as that in the foregoing example, but the shape of a rear end face 124a of a light guide plate 124 of the vehicle lamp 110 is partially different from that in the case of the light guide plate 24 of the previous example.

In particular, lens portions 124d, which cause light emitted from the respective light-emitting diodes 22 to enter the light guide plate 124 in the form of light substantially parallel to a vertical plane, are formed at the positions, which correspond to the respective light-emitting diodes 22, on the rear end face 124a of the light guide plate 124 of this implementation.

It is possible to make the light, which is emitted from the respective light-emitting diodes 22, efficiently enter band-like areas 124Z, which are positioned in front of the respective light-emitting diodes, by employing the structure of this implementation. Accordingly, it is possible to make the respective reflective elements 124s of the light guide plate 124 appear to emit light more brightly in the front view of the lamp.

The numerical values, which are described in the foregoing examples as dimensions, are merely illustrative; the dimensions may be appropriately set to different values in other implementations.

What is claimed is:

1. A vehicle lamp comprising:
   a plurality of light sources; and
   a light guide plate arranged to emit light to the front side of the lamp from a second surface facing a first surface by internally reflecting light, which is emitted from the respective light sources, by a plurality of reflective elements on the first surface after causing the light to enter the light guide plate from a rear end face of the light guide plate,
   wherein the light guide plate is curved to the first surface and gradually becomes thinner toward the front side, and
   the plurality of reflective elements are disposed at a predetermined interval in a longitudinal direction and extend in a direction crossing the longitudinal direction.

2. The vehicle lamp according to claim 1, wherein a longitudinal width of the reflective element, which is positioned on the further front side, of the respective reflective elements is set to a larger value.

3. The vehicle lamp according to claim 1, wherein the light guide plate is curved to the second surface toward an end portion in a direction orthogonal to the longitudinal direction.

4. The vehicle lamp according to claim 2, wherein the light guide plate is curved to the second surface toward an end portion in a direction orthogonal to the longitudinal direction.

* * * * *